United States Patent [19]

Takahira

[11] Patent Number: 4,960,982
[45] Date of Patent: Oct. 2, 1990

[54] IC CARD WITH SECURE MASS STORAGE MEMORY

[75] Inventor: Kenichi Takahira, Itami, Japan

[73] Assignee: Mitsubishi Denki Kabushiki Kaisha, Tokyo, Japan

[21] Appl. No.: 178,551

[22] Filed: Apr. 7, 1988

[30] Foreign Application Priority Data

Apr. 9, 1987 [JP] Japan .................. 62-87801

[51] Int. Cl.$^5$ .................. G06K 7/01; G06K 19/08; G06K 19/073
[52] U.S. Cl. .................. 235/382; 369/14; 235/380; 235/492; 235/487
[58] Field of Search ............ 235/375, 380, 382, 487, 235/488, 492, 462; 369/14, 15, 59, 273, 52; 360/69

[56] References Cited

U.S. PATENT DOCUMENTS

| | | | |
|---|---|---|---|
| 4,284,716 | 8/1981 | Drexler et al. | 430/510 |
| 4,338,644 | 7/1982 | Staar | 360/69 |
| 4,672,182 | 6/1987 | Hirokawa | 235/375 |
| 4,672,600 | 6/1987 | Balston et al. | 369/14 |
| 4,677,604 | 6/1987 | Selby et al. | 369/52 |
| 4,723,181 | 2/1988 | Hickok | 369/15 |
| 4,746,788 | 5/1988 | Kawana | 235/492 |

OTHER PUBLICATIONS

Nikkei Electronics, No. 401, pp. 107-115 (Aug. 11, 1986).

Primary Examiner—Stuart S. Levy
Assistant Examiner—Robert A. Weinhardt
Attorney, Agent, or Firm—Leydig, Voit & Mayer

[57] ABSTRACT

An information recording system utilizing an IC card having an onboard microprocessor, an onboard semiconductor memory which can be accessed from outside the card only by way of the microprocessor, and an onboard mass storage device also accessible from outside the card but directly rather than through the microprocessor. The mass storage device can be a mass storage magnetic recording media or preferably an optical storage device, and provides a relatively inexpensive information storage media for large amounts of data. The semiconductor memory stores information which is necessary to properly access the information in the mass storage memory, and outputs that information to an associated interface unit only by way of the microprocessor. Thus, address or encryption information which is stored in the semiconductor memory is secure because of access being limited by the onboard microprocessor, and securing that information makes more secure the information stored in the mass storage device.

9 Claims, 4 Drawing Sheets

IC CARD WITH SECURE MASS STORAGE MEMORY

BACKGROUND OF THE INVENTION

This invention relates to information storage devices and more particularly to storage devices of the credit card type which can be carried in the wallet but which can store a substantial quantity information.

IC cards are available which incorporate an onboard microprocessor and an onboard semiconductor memory. Those cards have substantially increased the amount and flexibility of information which can be recorded in a carry-around wallet-sized device, but are still limited in the amount of information which can be stored and the cost per unit information for such storage. More particularly, while semiconductor memories can be considered to be "inexpensive" in the context of providing operating memory in a computer, they are not quite so "inexpensive" when considered in the context of an ultimately disposable credit card of the type issued in large numbers, and having a life span of say a few years.

One of the more inexpensive types of credit cards is the magnetic stripe card with which the public is generally familiar. It has no onboard processing power, but only a magnetic stripe which records certain limited information, typically recorded prior to issuance, and which information is typically not changed for the life of the card. In that environment, the recorded information usually relates to the identity of the user and the identity of the type of transaction which the card is designed to perform, but there is little additional information and no possibility of writing new information onto the card after issuance. While such cards have served their purpose, it is desirable in many instances to provide a card with additional mass storage capability, but which still possesses some of the security characteristics which prevent readout of the information except by authorized parties and on authorized terminals.

Mass storage devices are available such as optical recording media or large-scale magnetic recording media, but their drawback in the present context is the insecure method of recording—i.e., once the information is recorded it can be read out by anyone having access to the storage medium. Thus, while such mass storage devices have the attractive feature of providing a low cost per unit of information stored, they do not have the security associated with the microprocessor controlled semiconductor memory.

SUMMARY OF THE INVENTION

In view of the foregoing, it is an aim of the present invention to provide an information recording system including a portable wallet-sized information storage card having a low cost per unit mass storage capability but providing security equivalent to microprocessor controlled cards.

In that regard, it is an object of the present invention to provide a system utilizing a mass storage memory media on the surface of a wallet-sized credit card and to associate with the mass storage media and provide on the credit card security means for guarding the information recorded in the mass storage memory.

In accordance with the invention, there is thus provided an information recording system including an IC card having an onboard microprocessor and an onboard semiconductor memory. Also disposed on the surface of the IC card is a supplemental mass storage device which can be accessed by an external reader/writer, but whose access is controlled in part by information stored in the semiconductor memory of the IC card under the control the microprocessor. Thus, in order to make intelligent use of the information stored in the mass storage device, it is necessary to interface with the microprocessor and through the microprocessor to its semiconductor memory in order to read out codes which facilitate writing or reading of the information in the mass storage device. As a result, although the mass storage device can be accessed by a compatible reader/writer, by virtue of its association with the microprocessor and semiconductor memory on the IC card, and the control of memory blocks exercised by the microprocessor, the information stored within the mass storage device is not readily accessible to the outside.

Other objects and advantages will become apparent with reference to the following detailed description when taken in conjunction with the drawings, in which:

DESCRIPTION OF THE PREFERRED EMBODIMENTS

While the invention will be described in connection with certain preferred embodiments, there is no intent to limit it to those embodiment. On the contrary, the intent is to cover all alternatives, modifications and equivalents included within the spirit and scope of the invention as defined by the appended claims.

Figure 1:
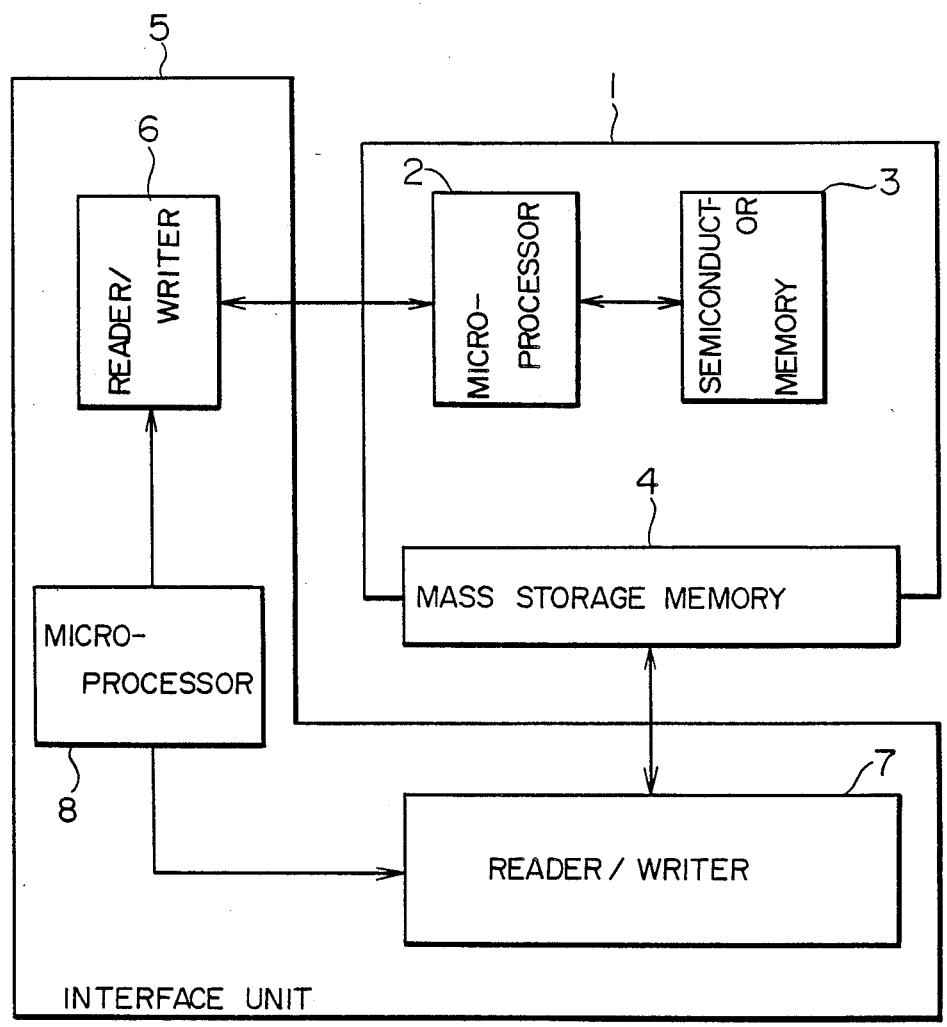
FIG. 1 is a block diagram showing a system for recording and controlling the security of information in accordance with the present invention.

Turning now to the drawings, FIG. 1 shows a system for information recording constructed in accordance with the present invention. The system includes an IC card 1 in the nature of a wallet-sized information storage medium which is put into operative association with an interface 5, sometimes referred to as a reader/writer. The IC card 1 has an onboard microprocessor 2 and an onboard semiconductor memory 3 which is controlled by and accessible through the microprocessor 2. In its typical application, the IC card 1 would utilize the semiconductor memory 3 for recording elements of information under the control of the microprocessor 2, and certain of those elements of information can be made accessible to the interface 5 under the control of the microprocessor 2. However, as noted above, the quantity of information which can be recorded in the semiconductor memory 3 is limited.

Therefore, and in practicing the invention, there is an additional mass storage memory 4 provided on the card which typically takes the form of an optical recording medium or a magnetic recording medium. The information within the mass storage memory 4 is also accessible to the interface 5 but in practicing the invention only under the control of information stored on the IC card in the semiconductor memory 3.

In its typical application, and as currently preferred, the mass storage device 4 comprises an optical storage medium which can be written or read by means of a laser reader/writer interface. For example, a reflective laser recording and data storage medium is disclosed in Drexler et al. U.S. Pat. No. 4,284,716. Optical devices such as those disclosed in that patent have a capacity for storage of significant amounts of information at a relatively low cost and, for that reason, are currently preferred in the practice of the present invention. However, other means such as magnetic storage means also can be utilized. The magnetic storage means can take the form, for example, of a magnetic stripe on the surface of the IC card which can be read by an associated magnetic reader in the interface unit, but access to which is limited in accordance with information stored in the semiconductor memory and accessible only through the microprocessor on the IC card. Other forms of mass information storage are also possible, although the optical and magnetic means are those that are currently preferred.

Turning now to the interface unit, it is seen that there are dual reader/writers including a first reader/writer 6 which interfaces through the microprocessor 2 to the semiconductor memory 3 on the IC card 1. In addition, there is a second reader/writer 7 which interfaces with the mass storage device 4 which is on the surface or accessible to the surface of the IC card 1. The interface unit 5 also includes processing means 8 which is responsive to enabling signals received by way of the semiconductor reader/writer 6 and which, when enabled, are used to allow access by the second reader/writer 7 to the mass storage memory 4.

It is significant to note that the reader/writer 7 which is adapted to interface with the mass storage memory 4 on the IC card cannot perform its function of reading or writing information to that mass storage device without signals derived ultimately from the semiconductor memory 3. The microprocessor 8 in the interface unit maintains the second reader/writer 7 in an inactive state until and unless appropriate enabling signals are provided by way of the first reader/writer 6 from the IC card.

Furthermore, an interface unit without the appropriate first reader/writer or microprocessor enabling means will be unable to intelligently read information from the mass storage device 4. While it can, for example, in the context of a laser storage medium, scan the surface of the optical storage device and read back certain information, the information is preferably recorded in separate blocks whose identity is known only in the semiconductor memory. Thus intelligent readout of the information is not possible without knowing where the appropriate blocks are stored, and such information is stored on the IC card in the semiconductor memory and accessible only through the onboard microprocessor.

As examples of use of a card according to the present invention, and not by way of limitation, such cards can be utilized as "employee cards" which maintain a current record of an employee's relationship with his employer in all respects including, for example, his relations with the credit union and payroll departments, or as medical information cards which carry personal physical and medical information which can be read out by an authorized reader in an emergency prior to providing medical treatment.

The manner in which the onboard microprocessor and semiconductor memory serve to cooperate with the interface unit in providing a system for mass storage of information under secure conditions using a mass storage memory which is typically not believed to be secure will now be described.

Figure 2:
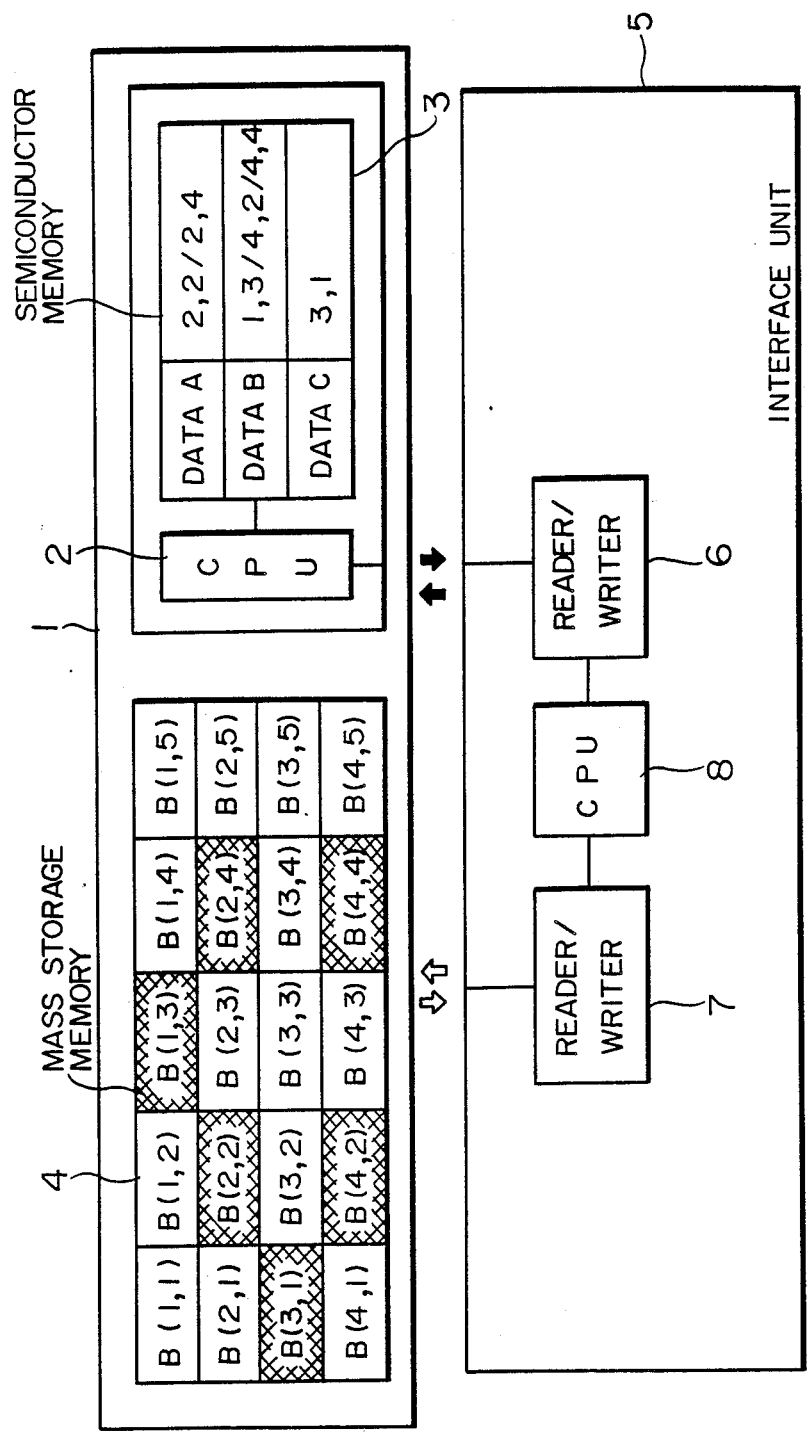
FIG. 2 is a diagram showing the interrelationship between fields in the mass storage memory and the data field identifiers stored in the semiconductor memory.

More particularly, turning to FIG. 2, there is shown an exemplary embodiment of the invention wherein the mass storage memory is divided into a plurality of defined fields for recording of different types of data, and in which the semiconductor memory stores information relating the field addresses to the type of data which is stored in the respective fields. As a result, interfacing with the secure semiconductor memory through the onboard microprocessor allows the system to determine which of the many fields store data related to that application, and the field addresses are then read out for allowing the reader/writer which interfaces with the mass storage memory to address only the necessary fields.

Referring in greater detail to FIG. 2, there is shown an IC card 1 having an onboard microprocessor 2 and onboard semiconductor memory 3. The interface unit 5 is shown to include a first reader/writer 6 which interfaces with the semiconductor memory 3 via the onboard microprocessor 2.

The mass storage memory 4 in the FIG. 2 embodiment is shown to include a matrix of individually addressable fields. In the illustrated embodiment, the fields are addressed by the X and Y coordinates for the field within the matrix, although other addressing schemes are clearly applicable. The reader/writer 7 in the interface unit 5 is directed by the interface processor 8 to read out the information stored in the mass storage memory 4 or write information into the mass storage memory 4 in the fields at specified addresses. While the reader/writer 7 can read information from or write information into the mass storage memory without knowing block addresses, by virtue of the fact that the memory is divided into definable blocks, and the blocks for any given collection of data are not identified in the mass storage memory 4, it is extremely difficult to simply read the information via the reader 7 without knowing the structure of the fields and in which field the data for any application is recorded.

In practicing the invention, a portion of the semiconductor memory 3 is devoted to data storage locations which relate identification data for the information recorded in the mass storage memory with information from which the fields in the mass storage memory can be determined. For example, it is seen that the memory 3 contains three locations for Data A, Data B and Data C, such data representing three types of information recorded in the mass storage memory 4. It is seen that associated with the directory Data A are two memory locations 2,2 and 2,4. Thus, when the interface unit 5 desires access to Data A, it operates through reader/writer 6 to interface through the onboard microprocessor 2 with the memory 3 to search the memory 3 for the Data A identifier. When that identifier is located in the semiconductor memory, the onboard microprocessor sends the associated block address information to the interface so that the mass storage memory block addresses can be determined. The processor 8 in the interface 5, having received the coordinate information from the IC card makes the computation to determine addresses within the mass storage memory, particularly in the present example addresses B(2,2) and B(2,4). The microprocessor 8 then passes those addresses to the interface 7 which scans the fields in the IC card to read out information previously recorded as Data A.

It is worthwhile to note that security is improved by recording data is non-contiguous fields to reduce the possibility of unauthorized access to the data. It is also worthy of note that the fields in the mass storage memory should be relatively small such that a number of fields are required for storing elements of data, thus making maximum use of the random distribution of data within the fields in locations which are stored in the semiconductor memory and thus inaccessible to an unauthorized user. The fields can be assigned and addresses determined by the onboard processor 2 or the interface processor 8, so long as it is appreciated that information from which the fields are to be identified is stored, not in the mass storage memory 4, but in the semiconductor memory 3 in association with an identifier for the data.

Figure 3:
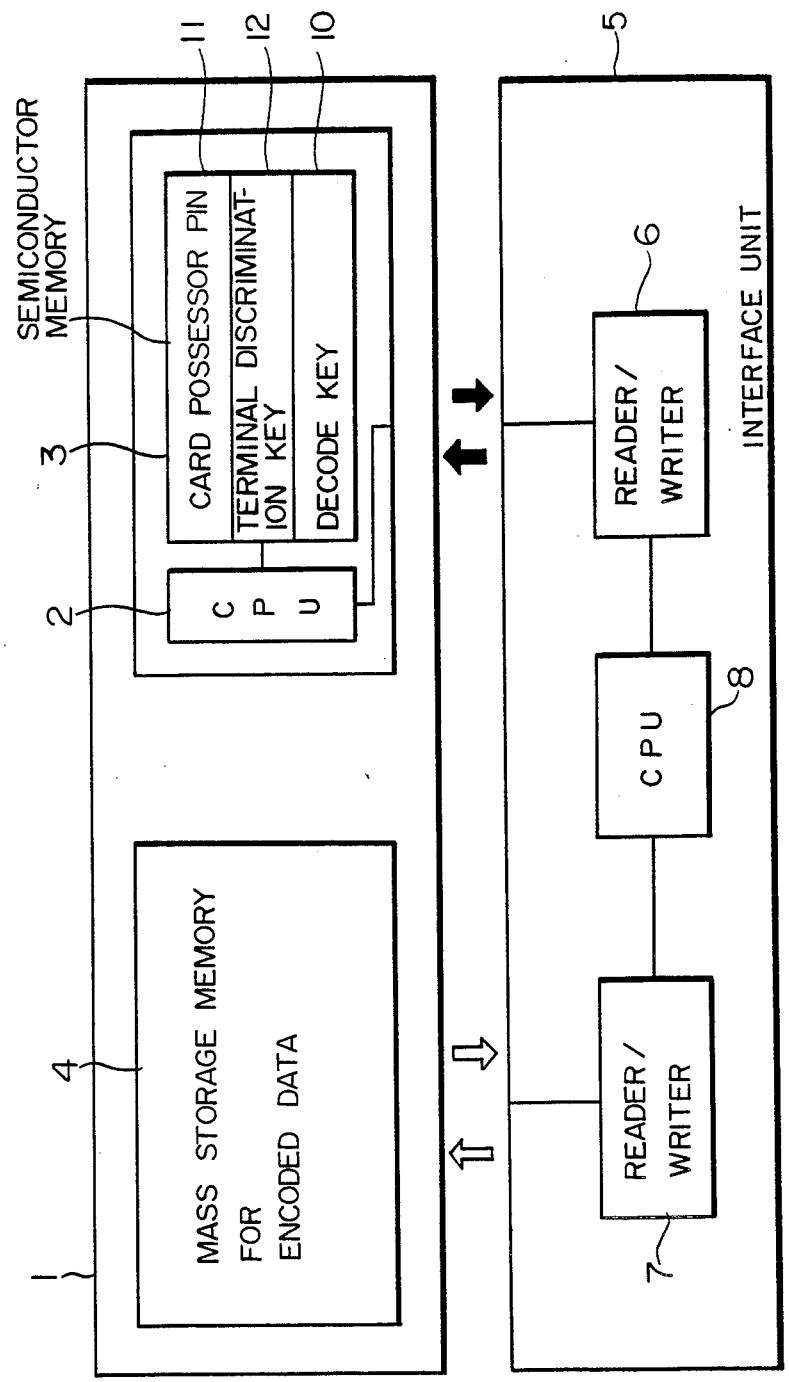
FIG. 3 is a diagram illustrating a typical embodiment of the invention utilizing encrypted data.

A second exemplary embodiment of the present invention is illustrated in FIG. 3. In the FIG. 3 embodiment, the information recorded in the mass storage memory 4 is in encoded or encrypted format and the encoding or decoding key is stored in the semiconductor memory such that it can be passed to the interface unit for decoding data to be read from the mass storage memory or encoding data to be written into the mass storage memory all according to an encryption code which can be unique to that particular mass storage device.

FIG. 3 is similar to FIG. 2 and like elements bear the same reference numerals. The mass storage memory 4 is not illustrated as being divided into individual addressable blocks, although it could be for even further security. However, the mass storage device of FIG. 3 is intended to receive encoded or encrypted data such that even if an interface unit such as a laser reader could read out the stored information, absent the possession of the encryption key it could not determine the intelligence in the stored data.

In practicing the invention, the semiconductor memory 3 which is accessible to the interface unit 5 only by way of the onboard microprocessor 2 stores information necessary for intelligently encoding or decoding information in the mass storage memory 4. In the embodiment illustrated in FIG. 3, that information is primarily an encode/decode key stored in location 10. In addition, and as can be practiced in any embodiment of the present invention, the semiconductor memory also has a storage location 11 for storage of a personal identification number (PIN) which is known to the user and which when entered into the interface unit can be compared by the processor 2 for determining if the user has proper access to the card. In addition, a terminal discrimination key is stored at location 12. The terminal discrimination key is unique to a particular type of interface unit and is input by the interface unit along with the PIN number to assure not only that the user has proper access to the card but the terminal is of the proper type. Having input those pieces of information, the decode key in location 10 is read out through the CPU to the interface unit such that it is available to the interface microprocessor 8 for encoding information to be recorded in the mass storage device 4 or decoding information to be read from the mass storage device 4.

It is noted that a number of encode/decode keys can be utilized with data of various types and associated with data identifiers such as in the FIG. 2 embodiment. In such a system, each particular data type has associated information stored in the semiconductor memory which includes both block address identifiers and the appropriate encode/decode key for the data stored at those addresses. It will also now be apparent that different encode and decode keys can be utilized for the same data when that is deemed to be appropriate.

Figure 4:
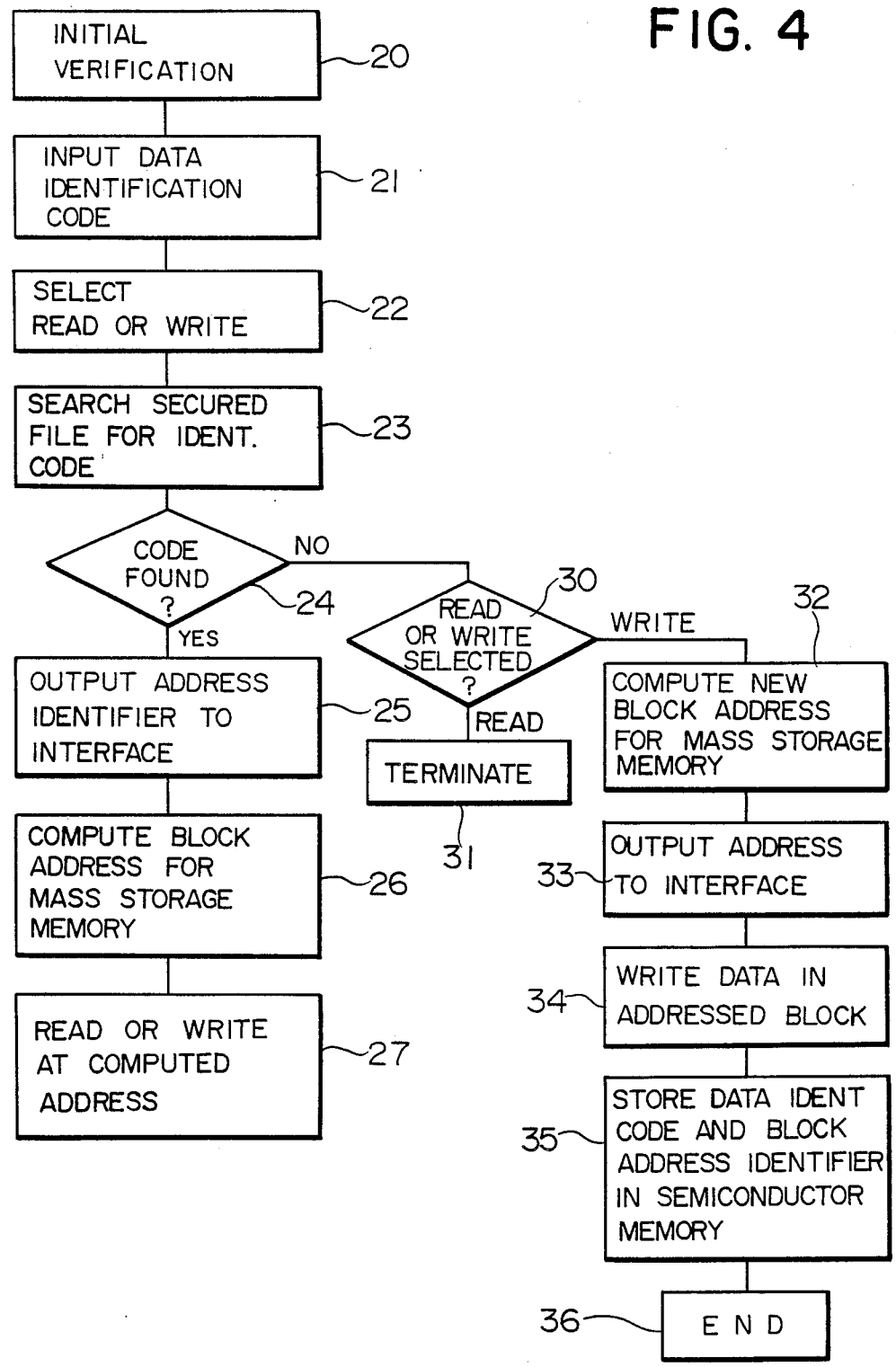
FIG. 4 is a flowchart illustrating the manner of operation of the exemplary system.

FIG. 4 illustrates an exemplary procedure which is executed by the IC card in conjunction with the interface unit by virtue of the respective programs stored in the memories associated with the IC card and the microprocessor in the interface unit. It is seen that the process begins with an initial step 20 which relates to verification procedures. Such verification typically includes inputting through the interface unit of a PIN number and comparing that number with a PIN number stored in the semiconductor memory. Preferably, the step also includes inputting a number identifying the interface terminal to the onboard microprocessor and comparing that number with a stored authorized terminal number before allowing the transaction. When initial verification is complete and if both the user and the terminal have satisfied the internal tests for verification, the process proceeds to a step 21 which allows the user to input a data identification code, called for shorthand in connection with FIG. 2 Data A, Data B, etc. At the same time or later in the process, the user can input via the terminal an indication as to whether a read operation or a write operation is desired, and that step is indicated in the flow chart as step 22.

In the step 23 the onboard microprocessor searches the onboard semiconductor memory for the data identifier which the user had input. Assuming, for example, that the user had input the identifier relating to Data B of FIG. 2, the onboard microprocessor would search the identification files until Data B was located. The location of Data B would thereupon identify the associated addresses within the mass storage memory where information relating to Data B had been or is to be recorded. Alternatively, in the encryption system of FIG. 3, identification of the data which was to be accessed would locate the encryption or decryption key associated with that data. The step 24 relates to the process performed by the onboard microprocessor for searching its associated semiconductor memory to find the identification code which the user had input. If the code is found, a step 25 is performed to output the associated address identifier to the interface. As indicated above, that address identifier can be the matrix address or other address which identifies the location in the mass storage memory where the data is recorded, or in the encryption system can be the encryption code for that data. In either event, the process proceeds to a step 26 by which the interface unit accepts the output information and uses that information to access the mass storage memory. In the illustrated embodiment, the interface microprocessor computes the mass storage address for the data in question then proceeds to a step 27 which reads or writes information at the computed address. In the encrypted system, the step 26 would be altered to include the transmittal of the encryption or decryption key to the interface microprocessor and the control by the interface microprocessor of recording or readback under the control of the transmitted key.

Returning to the decision step 24, if the identification code which the user had input is not found within the semiconductor memory, the process proceeds to a step 30 which tests whether in the step 22 the user had selected a read or a write operation. If a read operation had been selected, a step 31 is performed which terminates the operation because the user has attempted to select a data field for reading which does not exist. However, if the write operation has been selected, the process proceeds to a step 32 which allows the user to write new data into a new field. The step 32 computes a new block address for the mass storage memory which has not yet been allocated. The process then proceeds to a step 33 which outputs that address information to the interface unit and a step 34 by which the interface unit calculates an address within the mass storage memory, and uses that address to direct the reader/writer associated with the mass storage device to the appropriate block in the mass storage memory for writing information in that new block. After the information is written, a step 35 is performed in which the interface unit microprocessor communicates with the onboard microprocessor to cause the recording in the onboard semiconductor memory of the data identification code in association with the block address assigned to it such that the data can be found for subsequent readout.

In the case where the data to be recorded is too voluminous for storage within a single block, as will be the typical case, the process of computing block addresses, outputting those addresses to the interface, writing data in the newly assigned fields, and recording in association with the data identifier information from which the address can be calculated is repeated until all data is written following which the process terminates at the step 36.

It will now be appreciated that what has been provided is an information storage card and a system utilizing such card which has a mass storage device capable of storing a large amount of data at a reasonable price and a semiconductor memory operating in conjunction with a microprocessor for assuring the security of the information in the mass storage device. The semiconductor memory is accessible to an interface unit only through the onboard microprocessor and maintains information essential to interpreting the data recorded in the mass storage device. When data is to be recorded or read out of the mass storage device, the interface unit operates through the microprocessor to the semiconductor memory to derive information necessary for interpreting the stored information and utilizes that information in so interpreting it. As a result, the information in the mass storage device which in the past has been considered non-secure is now provided an additional degree of security as a result of the invention.

What is claimed is:

1. An information recording system comprising:
    an IC card having an onboard microprocessor, an onboard semiconductor memory controlled by the onboard microprocessor, and an onboard mass storage memory accessible from the surface of the IC card,
    interface means having first reader/writer means for interfacing with the semiconductor memory through the microprocessor and second reader/writer means for interfacing directly with the mass storage memory,
    the mass storage memory having separately identifiable fields for storing blocks of data, at least some of the fields being non-contiguous but adapted to store blocks of data which are related to each other,
    the semiconductor memory having storage locations for storing field identification information needed to selectively identify fields in the mass storage memory storing blocks of related data,
    and means in the interface unit for accessing the field identification information from the semiconductor memory through the microprocessor and utilizing said field identification information for accessing blocks of related data in the mass storage memory.

2. The information recording system according to claim 1 wherein said field identification information relates to block addresses within the mass storage memory, at least some of the block addresses identifying non-contiguous fields adapted to store related information, the semiconductor memory serving to relate the block addresses for the fields which store blocks of related information.

3. The information recording system according to claim 1 wherein the field identification information further includes an encryption code for encoding and decoding the information stored in the mass storage memory.

4. An information recording system according to claim 3 wherein the semiconductor memory onboard the IC card has storage locations for storing validity confirming information for confirming the validity of the card possessor as a precondition to allowing access to the security information.

5. An information recording system according to claim 4 wherein the semiconductor memory onboard the IC card has storage locations for storing validity confirming information for confirming the identity of the interface unit as a precondition to allowing access to the security information.

6. The information recording system according to claim 1 wherein the mass storage memory is a magnetic memory and the second reader/writer means is a magnetic reader/writer.

7. The information recording system according to claim 1 wherein the mass storage memory is an optical memory and the second reader/writer means includes laser means for interfacing with the optical recording means.

8. An information recording system comprising:
    an IC card having an onboard microprocessor and an onboard semiconductor memory connected to be addressable by the microprocessor but not addressable directly from outside the card,
    an onboard mass storage memory having separately identifiable fields for storing blocks of information, at least some of the fields being non-contiguous but adapted to store related blocks of information, the onboard mass storage memory adapted to be accessible by external means when provided an enabling code including address codes identifying particular data blocks,
    means associated with the microprocessor for storing enabling codes in the semiconductor memory, the enabling codes allowing access to predetermined blocks of the memory of the mass storage memory containing related information,
    interface means having a first reader/writer means for communication with the semiconductor memory via the microprocessor and a second reader/writer means for communication with the mass storage memory,
    the interface means having means for accepting an enabling code from the microprocessor means for accessing particular blocks of the mass storage device containing related information, whereby the mass storage device is available for storage of related information in fields at least some of which are non-contiguous under the control of enabling codes stored in the semiconductor memory via the microprocessor means.

9. A secure mass storage device comprising, in combination:

a thin planar substrate in the form of a wallet sized card, semiconductor means embedded in said card including a microprocessor and a semiconductor memory, a mass storage memory accessible from outside the card and having a plurality of separately identifiable fields for reading and writing blocks of information, at least some of the fields being non-contiguous but adapted to store blocks of information which are related to each other, the semiconductor memory cooperating with the microprocessor to serve as means for causing the microprocessor to identify particular fields within the mass storage memory storing blocks of related information thereby to direct access to the identified fields for reading and writing therein, whereby access to particular fields in the mass storage memory on the card is identified by the information stored within the semiconductor memory and accessible through the microprocessor.

* * * * *